(12) United States Patent
Chang et al.

(10) Patent No.: US 11,942,168 B2
(45) Date of Patent: Mar. 26, 2024

(54) EFUSE STRUCTURE AND METHOD

(71) Applicant: TAIWAN SEMICONDUCTOR MANUFACTURING COMPANY, LTD., Hsinchu (TW)

(72) Inventors: Meng-Sheng Chang, Hsinchu (TW); Yao-Jen Yang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/295,148

(22) Filed: Apr. 3, 2023

(65) Prior Publication Data
US 2023/0245707 A1 Aug. 3, 2023

Related U.S. Application Data

(63) Continuation of application No. 17/541,245, filed on Dec. 2, 2021, now Pat. No. 11,621,046, which is a
(Continued)

(51) Int. Cl.
*G11C 17/16* (2006.01)
*G06F 30/392* (2020.01)
(Continued)

(52) U.S. Cl.
CPC ............ *G11C 17/16* (2013.01); *G06F 30/392* (2020.01); *G11C 17/18* (2013.01);
(Continued)

(58) Field of Classification Search
CPC ....... G11C 17/16; G11C 17/18; G11C 17/165; G11C 17/14; H10B 20/20; H10L 23/5256
See application file for complete search history.

(56) References Cited

U.S. PATENT DOCUMENTS 7,260,442 B2     8/2007    Hwang et al.
9,165,910 B2   10/2015   Eng et al.
(Continued)

FOREIGN PATENT DOCUMENTS

KR         20120037371      4/2012
KR    10-2017-0063195     6/2017
KR         20170063195      6/2017

*Primary Examiner* — Han Yang
(74) *Attorney, Agent, or Firm* — Hauptman Ham, LLP

(57) ABSTRACT

An IC structure includes a first active area including a first plurality of fin structures extending in a first direction, a second active area including a second plurality of fin structures extending in the first direction, an electrical fuse (eFuse) extending in the first direction between the first and second active areas and electrically connected to each of the first and second pluralities of fin structures, a first plurality of gate structures extending over the first active area perpendicular to the first direction, a second plurality of gate structures extending over the second active area in the second direction, a first signal line extending in the first direction adjacent to the first active area and electrically connected to the first plurality of gate structures, and a
(Continued)

second signal line extending in the first direction adjacent to the second active area and electrically connected to the second plurality of gate structures.

20 Claims, 13 Drawing Sheets

Related U.S. Application Data continuation of application No. 17/111,055, filed on Dec. 3, 2020, now Pat. No. 11,211,134, which is a continuation of application No. 16/419,648, filed on May 22, 2019, now Pat. No. 10,878,929.

(60) Provisional application No. 62/719,955, filed on Aug. 20, 2018.

(51) Int. Cl.
  *G11C 17/18* (2006.01)
  *H01L 23/525* (2006.01)
  *H01L 27/02* (2006.01)
  *H10B 20/20* (2023.01)
  *G06F 119/18* (2020.01)

(52) U.S. Cl.
  CPC ...... *H01L 23/5256* (2013.01); *H01L 27/0207* (2013.01); *H10B 20/20* (2023.02); *G06F 2119/18* (2020.01)

(56) References Cited

U.S. PATENT DOCUMENTS

| | | |
|---|---|---|
| 9,256,709 B2 | 2/2016 | Yu et al. |
| 2008/0002504 A1 | 1/2008 | Nakano |
| 2012/0039105 A1 | 2/2012 | Torige |
| 2013/0039117 A1 | 2/2013 | Lin et al. |
| 2013/0148409 A1* | 6/2013 | Chung ................ H01L 27/0924 257/4 |
| 2014/0040838 A1 | 2/2014 | Liu et al. |
| 2015/0278429 A1 | 10/2015 | Chang |
| 2017/0103947 A1 | 4/2017 | Cheng et al. |
| 2017/0154890 A1 | 6/2017 | Jin et al. |
| 2018/0174650 A1 | 6/2018 | Chung |
| 2019/0341107 A1 | 11/2019 | Bertin |

\* cited by examiner

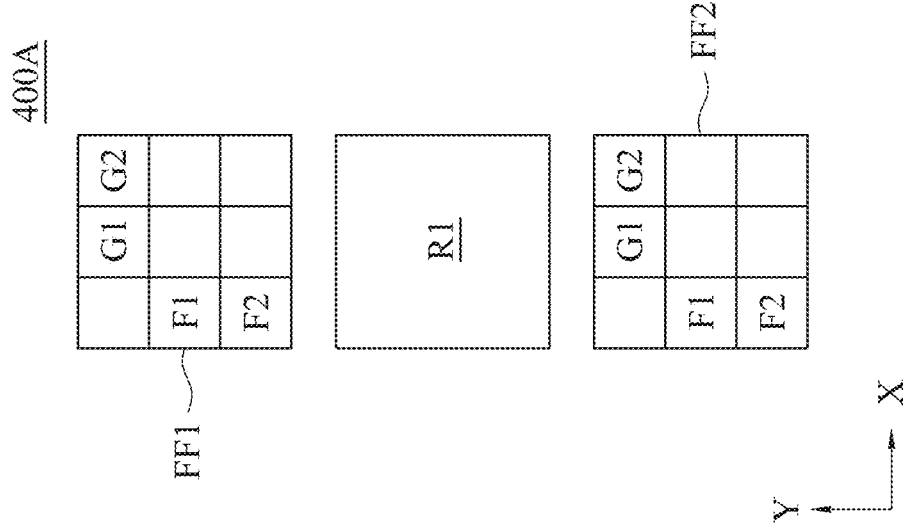

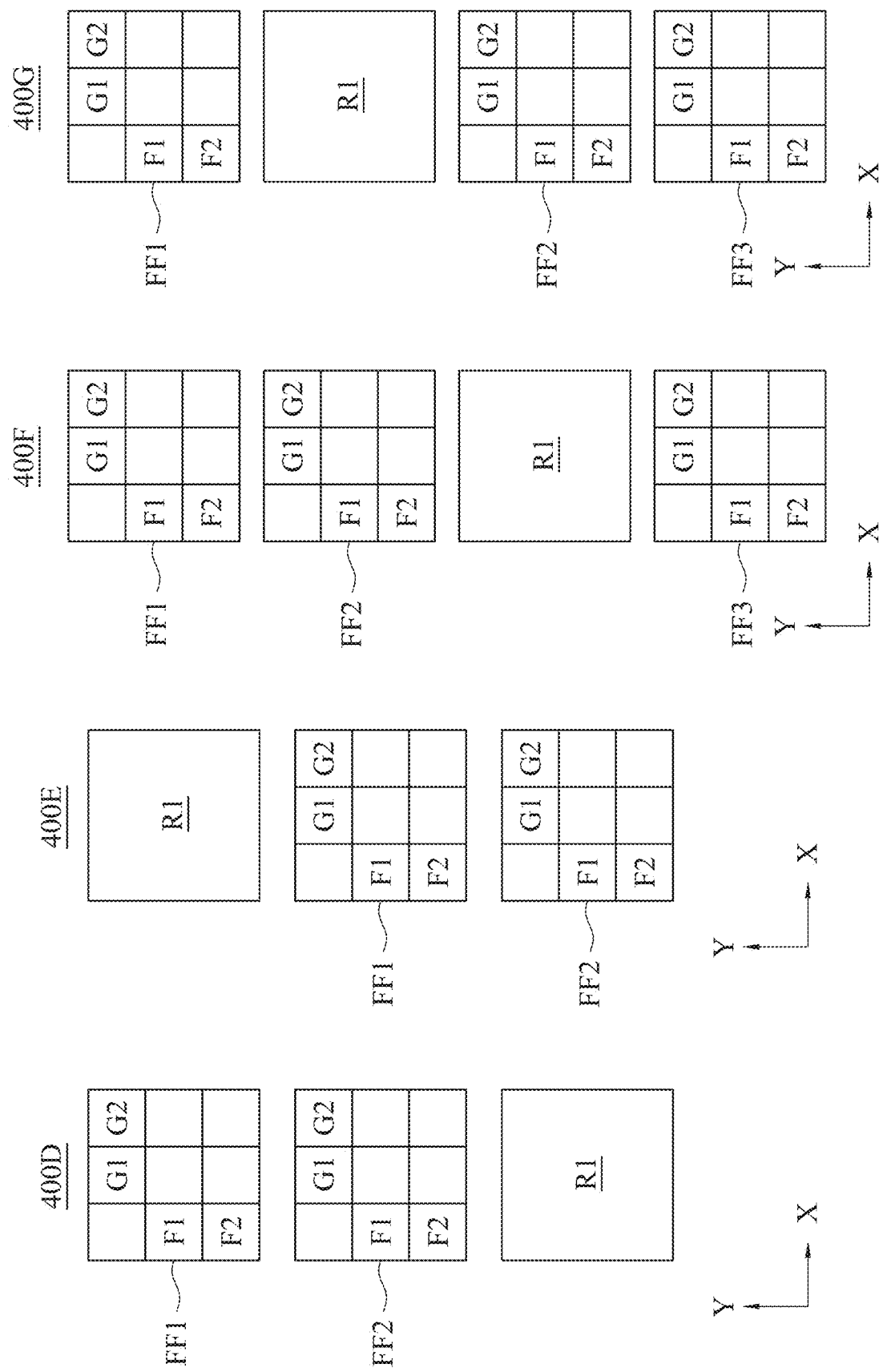

EFUSE STRUCTURE AND METHOD

PRIORITY CLAIM

The present application is a continuation of U.S. application Ser. No. 17/541,245, filed Dec. 2, 2021, which is a continuation of U.S. application Ser. No. 17/111,055, filed Dec. 3, 2020, now U.S. Pat. No. 11,211,134, which is a continuation of U.S. application Ser. No. 16/419,648, filed May 22, 2019, now U.S. Pat. No. 10,878,929, issued Dec. 29, 2020, which claims the priority of U.S. Provisional Application No. 62/719,955, filed Aug. 20, 2018, each of which is incorporated herein by reference in its entirety.

BACKGROUND

Integrated circuits (ICs) sometimes include one-time-programmable ("OTP") memory elements to provide non-volatile memory ("NVM") in which data are not lost when the IC is powered off. One type of NVM includes an electrical fuse (eFuse) integrated into an IC by using a narrow stripe (also called a "link") of conductive material (metal, polysilicon, or the like) connected to other circuit elements at each end. To program an eFuse, a programming current is applied to destructively alter (i.e., fuse) the link, thus increasing the resistance of the eFuse. Typically, to determine the status of an eFuse, a sense circuit is applied to the link and a comparison is made to a reference resistive device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A-4G are diagrams of eFuse structures, in accordance with some embodiments.

DETAILED DESCRIPTION

Figure 1A:
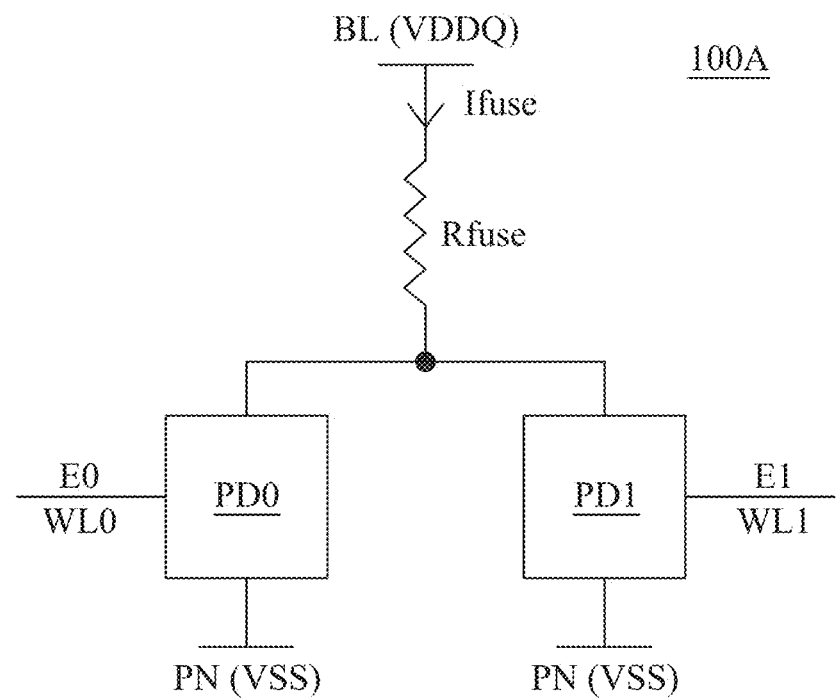
FIGS. 1A-1D are diagrams of eFuse circuits, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a circuit includes an eFuse and a first program device coupled in series between a bit line and a program node, and a second program device configured in parallel with the first program device. By being separately controllable, the first and second program devices enable an eFuse read current to be smaller than a program current, thereby reducing power in read operations compared to approaches in which a single program device is used for both programming and read operations.

In various embodiments, an IC layout diagram and resultant structure include an eFuse and first and second program devices having arrangements that enable program current path resistance and area requirements to be reduced compared to arrangements based on an eFuse and a single programming device. In various embodiments, fin field-effect transistors (FinFETs) are configured as program devices to realize these benefits.

FIGS. 1A-1D are diagrams of respective eFuse circuits 100A-100D, in accordance with some embodiments. Each one of circuits 100A-100D includes an eFuse Rfuse coupled between a program node PN and a bit line BL.

In the embodiment depicted in FIG. 1A, circuit 100A includes program devices PD0 and PD1 configured in parallel between eFuse Rfuse and program node PN configured to carry a reference voltage VSS. Program device PD0 is configured to receive a signal E0 on a signal line WL0, and is coupled in series with eFuse Rfuse between bit line BL and program node PN. Program device PD1 is configured to receive a signal E1 on a signal line WL1, and is coupled in series with eFuse Rfuse between bit line BL and program node PN.

Figure 1B:
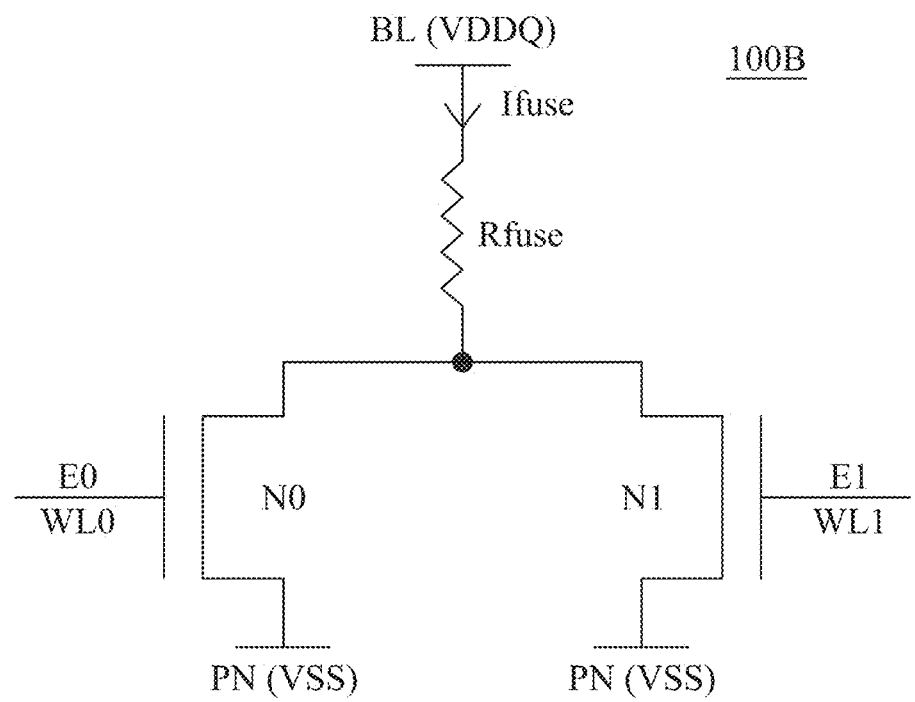

In the embodiment depicted in FIG. 1B, circuit 100B is a non-limiting example of circuit 100A in which program device PD0 includes an n-type metal-oxide semiconductor (NMOS) transistor N0 configured to receive signal E0 at a gate coupled with signal line WL0, and in which program device PD1 includes an NMOS transistor N1 configured to receive signal E1 at a gate coupled with signal line WL1.

Figure 1C:
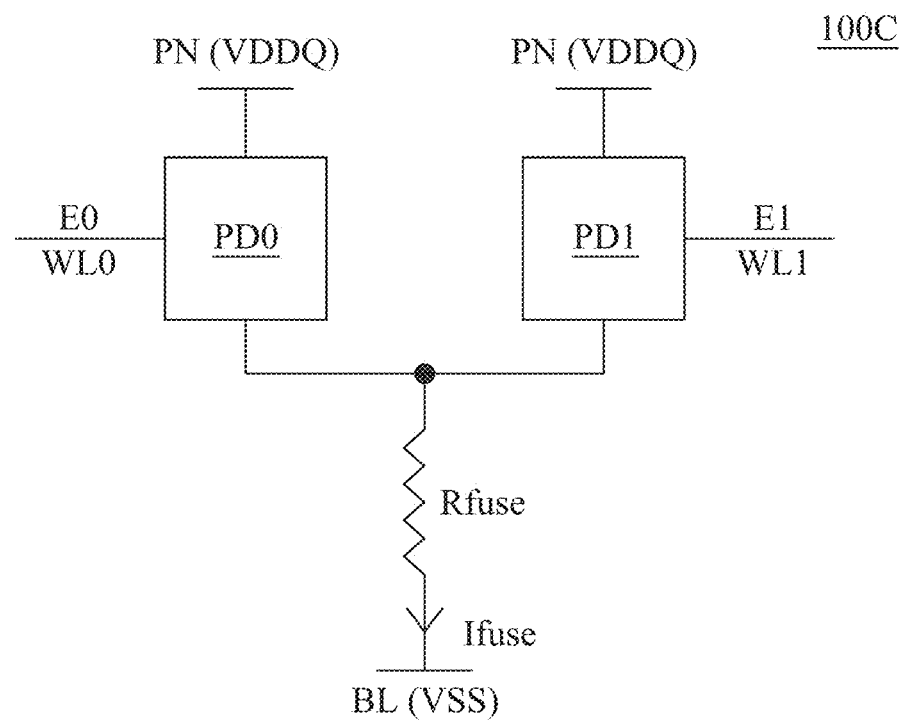

In the embodiment depicted in FIG. 1C, circuit 100C includes program devices PD0 and PD1 configured in parallel between eFuse Rfuse and program node PN configured to carry a power supply voltage VDDQ. Program device PD0 is configured to receive signal E0 on signal line WL0 and is coupled in series with eFuse Rfuse between program node PN and bit line BL. Program device PD1 is configured to receive signal E1 on signal line WL1 and is coupled in series with eFuse Rfuse between program node PN and bit line BL.

Figure 1D:
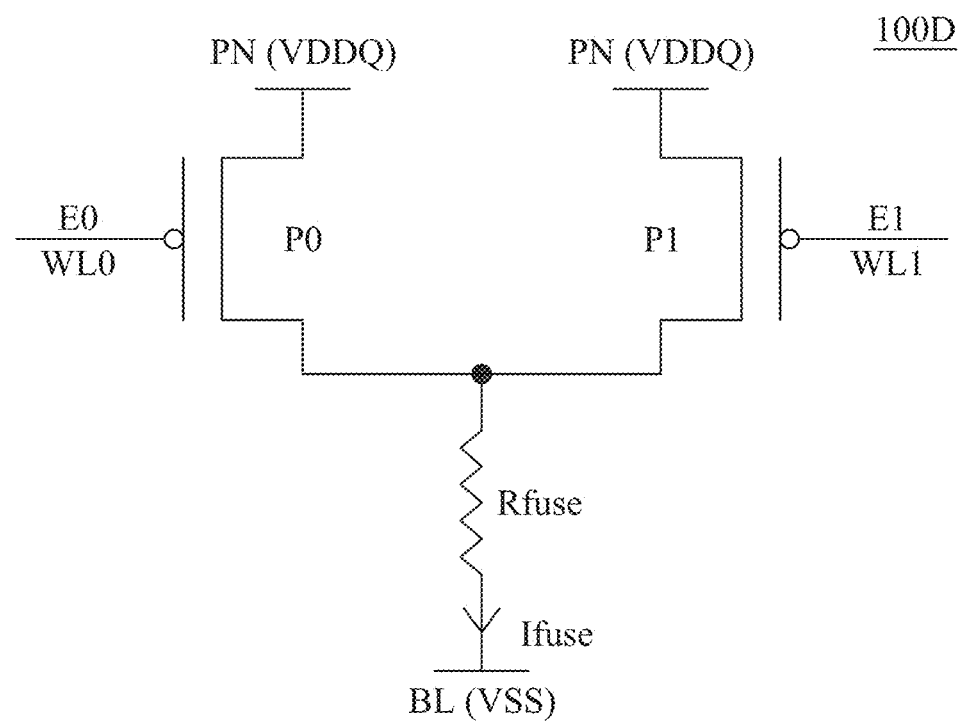

In the embodiment depicted in FIG. 1D, circuit 100D is a non-limiting example of circuit 100C in which program device PD0 includes a p-type metal-oxide semiconductor (PMOS) transistor P0 configured to receive signal E0 at a gate coupled with signal line WL0, and in which program device PD1 includes a PMOS transistor P1 configured to receive signal E1 at a gate coupled with signal line WL1.

Two or more circuit elements are considered to be coupled based on a direct electrical connection, a resistive or reactive electrical connection, or an electrical connection that includes one or more additional circuit elements and is thereby capable of being controlled, e.g., made resistive or open by a transistor or other switching device.

In each of the embodiments depicted in FIGS. 1A-1D, eFuse Rfuse is coupled between bit line BL and program devices PD0 and PD1. In various embodiments, eFuse Rfuse is coupled between program node PN and program devices PD0 and PD1, and program devices PD0 and PD1 are coupled between eFuse Rfuse and bit line BL.

In some embodiments, a circuit 100A-100D is some or all of a bit cell of a plurality of bit cells in which each bit cell is coupled with bit line BL. In some embodiments, bit line BL is one bit line of a plurality of bit lines. In some embodiments, a circuit 100A-100D is some or all of a bit cell of a plurality of bit cells of a memory circuit (not shown). In some embodiments, signal lines WL0 and WL1 are word lines of a memory circuit and signals E0 and E1 are word line signals configured to select a bit cell including a circuit 100A-100D in a programming or read operation. In some embodiments, a memory circuit includes one or more sense amplifiers (not shown) configured to determine a programmed state of a circuit 100A-100D in a read operation.

EFuse Rfuse is a circuit device including a conductive element capable of being sustainably altered, and thereby programmed, by a current Ifuse having a magnitude that exceeds a predetermined current level. In a non-programmed state, eFuse Rfuse has a small resistance relative to a resistance in a programmed state. In some embodiments, eFuse Rfuse includes an eFuse R1 discussed below with respect to FIGS. 3A and 3B.

Each one of program devices PD0 and PD1 is an IC device capable of switching between conductive and resistive states responsive to an input signal, e.g., one of signals E0 or E1, received at an input terminal (not labeled) coupled with a respective signal line WL0 or WL1. In a conductive state, the program device PD0 or PD1 has a low resistance current path between two current path terminals (not labeled), and, in a resistive state, the program device PD0 or PD1 has a high resistance current path between the two current path terminals.

In the conductive state, the program device PD0 or PD1 is capable of having the low resistance current path only for current values up to a predetermined current saturation level, and has a significantly higher relative resistance path for current values above the saturation level. In operation, the program device PD0 or PD1 thereby acts to limit the value of a current flowing between the two current path terminals in response to an increasing voltage difference across the two current path terminals.

In various embodiments, program devices PD0 and PD1 are same or different program devices. Same program devices have low resistance current paths having substantially the same resistance value and substantially the same saturation level. In various embodiments, different program devices have low resistance current paths having one or both of substantially different resistance values or substantially different saturation levels.

In various embodiments, one or both of program devices PD0 or PD1 includes a transmission gate, a MOS transistor, a field effect transistor (FET), a FinFET, a bipolar transistor, or other suitable IC device capable of switching between conductive and resistive states responsive to an input signal. In various embodiments, program devices PD0 and PD1 include FinFETs having a same number of fins and a same number of gates, or FinFETs having different numbers of one or both of fins and/or gates. In various embodiments, program devices PD0 and PD1 include FinFETs FF1 and FF2, discussed below with respect to FIGS. 4A-4G, or FinFETs 600FF1 and 600FF2, discussed below with respect to FIG. 6.

Because program devices PD0 and PD1 are responsive to separate input signals, program devices PD0 and PD1 are separately controllable. In various embodiments, one or both of program devices PD0 or PD1 is configured to respond to an input signal having logic levels corresponding to the respective conductive and resistive states.

In the embodiment depicted in FIG. 1B, each one of NMOS transistors N0 and N1 is configured to be in the conductive state responsive to the respective signal E0 or E1 having a high logic level, and to be in the resistive state responsive to the respective signal E0 or E1 having a low logic level. In the embodiment depicted in FIG. 1D, each one of PMOS transistors P0 and P1 is configured to be in the conductive state responsive to the respective signal E0 or E1 having the low logic level, and to be in the resistive state responsive to the respective signal E0 or E1 having the high logic level.

By the configurations discussed above, each one of circuits 100A-100D is capable of coupling eFuse Rfuse to program node PN with two parallel low resistance paths provided by each one of program devices PD0 and PD1 being in the conductive state responsive to a first configuration of input signals E0 and E1, coupling eFuse Rfuse to program node PN with a single low resistance path provided by one of program devices PD0 or PD1 being in the conductive state and the other of program devices PD0 or PD1 being in the resistive state responsive to a second configuration of input signals E0 and E1, and decoupling eFuse Rfuse from program node PN with two parallel high resistance paths provided by each one of program devices PD0 and PD1 being in the resistive state responsive to a third configuration of input signals E0 and E1.

Because of the parallel configuration of program devices PD0 and PD1, a total path resistance between eFuse Rfuse and program node PN corresponding to the first configuration of input signals E0 and E1 is less than the total path resistance between eFuse Rfuse and program node PN corresponding to the second configuration of input signals E0 and E1. In operation, because a program device PD0 or PD1 in the conductive state acts to limit the value of a current flowing between the two current path terminals, current Ifuse corresponding to the second configuration of input signals E0 and E1 is limited based on the saturation level of a single program device PD0 or PD1, and current Ifuse corresponding to the first configuration of input signals E0 and E1 is limited based on the combined saturation levels of program devices PD0 and PD1.

In various embodiments, one or more of circuits 100A-100D includes one or more program devices (not shown) in addition to, and configured in parallel with, program devices PD0 and PD1. If present, each additional program device is configured to further couple eFuse Rfuse to program node PN by providing an additional low resistance path responsive to one of input signals E0 or E1 received on corresponding signal line WL0 or WL1, thereby reducing the total path resistance and increasing current Ifuse responsive to one or both of the first or second configurations of input signals E0 or E1 compared to embodiments in which a circuit 100A-100D does not include one or more program devices in addition to program devices PD0 and PD1.

In some embodiments, the first configuration of input signals E0 and E1 corresponds to a programming operation and the second configuration of input signals E0 and E1 corresponds to a read operation. Each one of circuits 100A-100D thereby provides the total path resistance in the programming operation lower than the total path resistance in the read operation, and provides current Ifuse in the programming operation greater than current Ifuse in the read operation.

In some embodiments depicted in FIG. 1B, the programming operation corresponds to the first configuration of signals E0 and E1 in which each of signals E0 and E1 has the high logic level, and the read operation corresponds to the second configuration of signals E0 and E1 in which one of signals E0 or E1 has the high logic level and the other of signals E0 or E1 has the low logic level. In some embodiments depicted in FIG. 1D, the programming operation corresponds to the first configuration of signals E0 and E1 in which each of signals E0 and E1 has the low logic level, and the read operation corresponds to the second configuration of signals E0 and E1 in which one of signals E0 or E1 has the high logic level and the other of signals E0 or E1 has the low logic level.

In some embodiments, the third configuration of input signals E0 and E1 corresponds to a de-selected state in which each one of circuits 100A-100D causes current Ifuse to be limited to a low value, e.g., a leakage current level, relative to the current limits in the programming and read operations based on the parallel high resistance paths provided by program devices PD0 and PD1. In some embodiments depicted in FIG. 1B, the de-selected state corresponds to the third configuration of signals E0 and E1 in which each of signals E0 and E1 has the low logic level. In some embodiments depicted in FIG. 1D, the de-selected state corresponds to the third configuration of signals E0 and E1 in which each of signals E0 and E1 has the high logic level.

In the embodiments depicted in FIGS. 1A-1D, circuits 100A-100D are configured to receive signals E0 and E1 on signal lines WL0 and WL1 from one or more circuits (not shown) external to circuits 100A-100D. In various embodiments, one or more of circuits 100A-100D includes one or more circuits (not shown) configured to generate signals E0 and E1 on signal lines WL0 and WL1.

By the parallel program device configuration discussed above, each one of circuits 100A-100D is capable of being selected to perform a read operation in which current Ifuse is less than current Ifuse in a programming operation, thereby using less power during read operations than approaches in which a single program device is used to provide a read current in read operations the same as a program current in programming operations.

Figure 2:
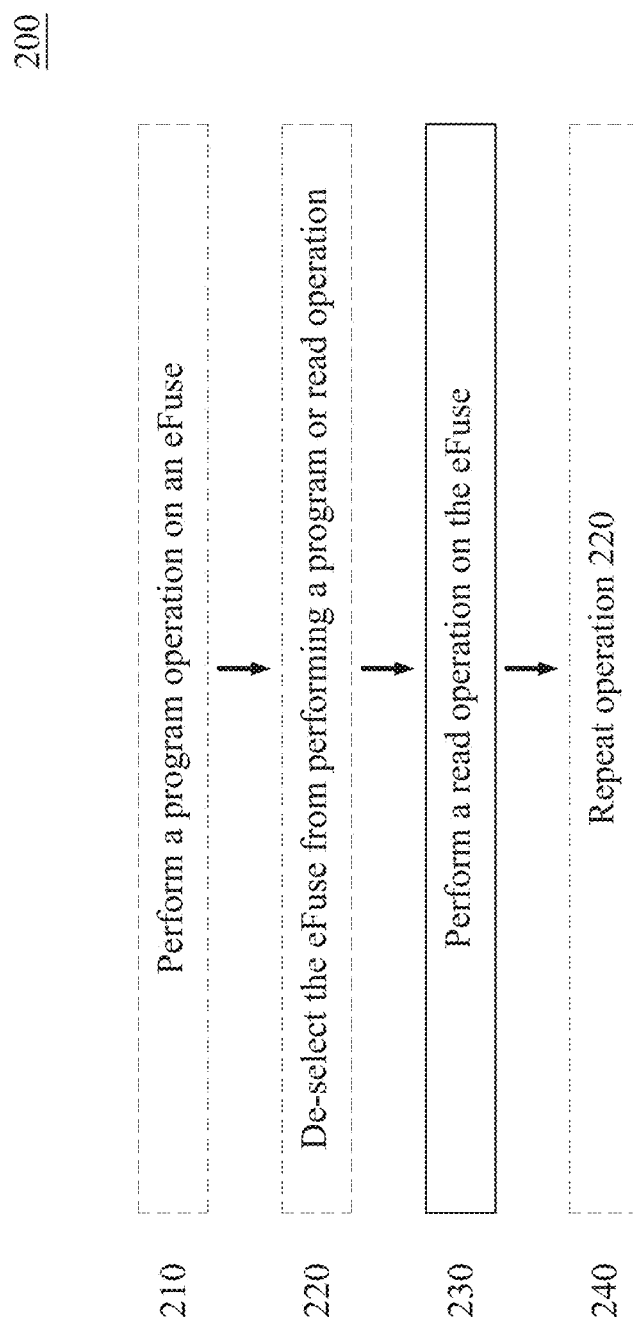
FIG. 2 is a flowchart of a method of determining a status of an eFuse, in accordance with some embodiments.

FIG. 2 is a flowchart of a method 200 of determining a status of an eFuse, in accordance with one or more embodiments. Method 200 is usable with a circuit, e.g., a circuit 100A-100D discussed above with respect to FIGS. 1A-1D.

The sequence in which the operations of method 200 are depicted in FIG. 2 is for illustration only; the operations of method 200 are capable of being executed in sequences that differ from that depicted in FIG. 2. In some embodiments, operations in addition to those depicted in FIG. 2 are performed before, between, during, and/or after the operations depicted in FIG. 2.

In some embodiments, the operations of method 200 are a subset of operations of a method of operating a memory circuit. In some embodiments, the eFuse is part of a bit cell of a memory circuit, and determining the status of the eFuse corresponds to determining a logical status of the bit cell.

At operation 210, in some embodiments, a programming operation is performed by turning on a first program device and a second program device to cause a program current to flow in the eFuse. The first and second program devices are configured in parallel, and each of the first and second program devices is coupled in series with the eFuse between a program node and a bit line. Turing on the first and second program devices causes the first and second devices to provide parallel low resistance paths between the program node and the bit line such that the program current is the sum of the currents flowing in the two parallel paths.

In various embodiments, turning on the first and second program devices includes turning on one or more program devices in addition to the first and second program devices, thereby causing the one or more additional program devices to provide one or more additional parallel low resistance paths between the program node and the bit line such that the program current is the sum of the currents flowing in more than two parallel paths.

In various embodiments, turning on the first and second program devices includes turning on the first and second program devices coupled between the eFuse and the program node or coupled between the eFuse and the bit line. In various embodiments, performing the programming operation includes applying a power supply voltage to the program node and a reference voltage to the bit line, or applying the reference voltage to the program node and the power supply voltage to the bit line.

In various embodiments, turning on the first program device and the second program device to cause a program current to flow in the eFuse includes turning on program devices PD0 and PD1 in a circuit 100A-100D to cause current Ifuse to flow in eFuse Rfuse coupled between program node PN and bit line BL, discussed above with respect to FIGS. 1A-1D.

Causing the program current to flow in the eFuse includes causing the program current to have a magnitude sufficiently large to sustainably increase a resistance value of the eFuse from that of a non-programmed state to that of a programmed state. In some embodiments, causing the program current to flow in the eFuse includes causing the program current to flow in eFuse R1 discussed below with respect to FIGS. 3A and 3B.

In some embodiments, turning on the first program device is in response to a first signal, and turning on the second program device is in response to a second signal. In some embodiments, the first and second signals are word line signals received by the first and second program devices on first and second word lines. In some embodiments, the first and second signals are signals E0 and E1 received on respective word lines WL0 and WL1, discussed above with respect to FIGS. 1A-1D.

In some embodiments, performing the programming operation includes storing a logical value in a bit cell selected from a plurality of bit cells of a memory circuit. In some embodiments, storing the logical value in the bit cell is part of storing data, e.g., identification, security, or circuit configuration data, in a memory of an IC.

At operation 220, in some embodiments, the eFuse is de-selected from performing a program or read operation by turning off each of the first and second program devices. Turing off the first and second program devices causes the first and second devices to provide parallel high resistance paths between the program node and the bit line such that any current flowing through the eFuse has a low value, e.g., a leakage current level, relative to the program current in operation 210 and the read current in operation 230.

In various embodiments, turning off the first and second program devices includes turning off one or more program devices in addition to the first and second program devices, thereby causing the one or more additional program devices to provide one or more additional parallel high resistance paths between the program node and the bit line.

In various embodiments, turning off the first and second program devices includes turning off the first and second program devices coupled between the eFuse and the program node or coupled between the eFuse and the bit line. In various embodiments, turning off the first program device and the second program device to de-select the eFuse includes turning off program devices PD0 and PD1 in a circuit 100A-100D to de-select eFuse Rfuse coupled between program node PN and bit line BL, discussed above with respect to FIGS. 1A-1D.

In some embodiments, turning off the first program device is in response to the first signal, and turning off the second program device is in response to the second signal. In some embodiments, turning off the first program device is in response to one of signals E0 or E1 received on the corresponding one of word line WL0 or WL1, and turning off the second program device is in response to the other of signals E0 or E1 received on the corresponding other of word line WL0 or WL1, discussed above with respect to FIGS. 1A-1D.

At operation 230, a read operation is performed by turning on the first program device to cause a read current to flow through the eFuse and by turning off the second program device. Turning on the first program device causes the first program device to provide a low resistance path between the program node and the bit line, and turning off the second program device causes the second program device to provide a high resistance path between the program node and the bit line such that the read current is substantially equal to the current flowing through the low resistance path.

Because the read current is based on the low resistance path provided by the first program device, and the program current is based on the parallel low resistance paths provided by the first and second program devices, the program current is larger than the read current.

In various embodiments, one or both of turning on the first program device or turning off the second program device includes turning one or more additional program devices on or off such that the program current is based on a number of parallel paths larger than a number of parallel paths on which the read current is based, the program current thereby being larger than the read current.

In various embodiments, turning on the first program device and turning off the second program device includes turning on the first program device and turning off the second program device coupled between the eFuse and the program node or coupled between the eFuse and the bit line. In various embodiments, performing the read operation includes applying the power supply voltage to the program node and the reference voltage to the bit line, or applying the reference voltage to the program node and the power supply voltage to the bit line. In various embodiments, the power supply voltage has a same or different value than a value of the power supply voltage applied in operation 210, and/or the reference voltage has a same or different value than a value of the reference voltage applied in operation 210.

In various embodiments, turning on the first program device and turning off the second program device to cause a read current to flow in the eFuse includes turning on one of program devices PD0 or PD1 and turning off the other of program devices PD0 or PD1 in a circuit 100A-100D to cause current Ifuse to flow in eFuse Rfuse coupled between program node PN and bit line BL, discussed above with respect to FIGS. 1A-1D.

Causing the read current to flow in the eFuse includes causing the read current to have a magnitude sufficiently large to distinguish between the resistance value of the eFuse in the non-programmed state to the resistance value of the eFuse in the programmed state. In some embodiments, causing the read current to flow in the eFuse includes causing the read current to flow in eFuse R1 discussed below with respect to FIGS. 3A and 3B.

In various embodiments, causing the read current to flow includes one or more of generating a voltage based on the resistance value of the eFuse, applying a current having the read current value to a reference resistive device, generating a voltage based on a resistance value of the reference resistive device, comparing voltages based on the resistance values of the eFuse and the reference resistive device using a sense amplifier, or generating a signal indicative of a result of comparing the voltages based on the resistance values of the eFuse and the reference resistive device.

In some embodiments, turning on the first program device is in response to the first signal, and turning off the second program device is in response to the second signal. In some embodiments, turning on the first program device is in response to one of signals E0 or E1 received on the corresponding one of word line WL0 or WL1, and turning off the second program device is in response to the other of signals E0 or E1 received on the corresponding other of word line WL0 or WL1, discussed above with respect to FIGS. 1A-1D.

At operation 240, in some embodiments, operation 220 is repeated to de-select the eFuse from performing a program or read operation by turning off each of the first and second program devices, as discussed above with respect to operation 220.

By performing some or all of the operations of method 200, the status of an eFuse is determined using a parallel program device configuration such that performing a read operation uses a read current less than a program current used in a programming operation, thereby using less power during read operations than approaches in which a single program device is used to provide a read current in read operations the same as a program current in programming operations.

Figure 3A:
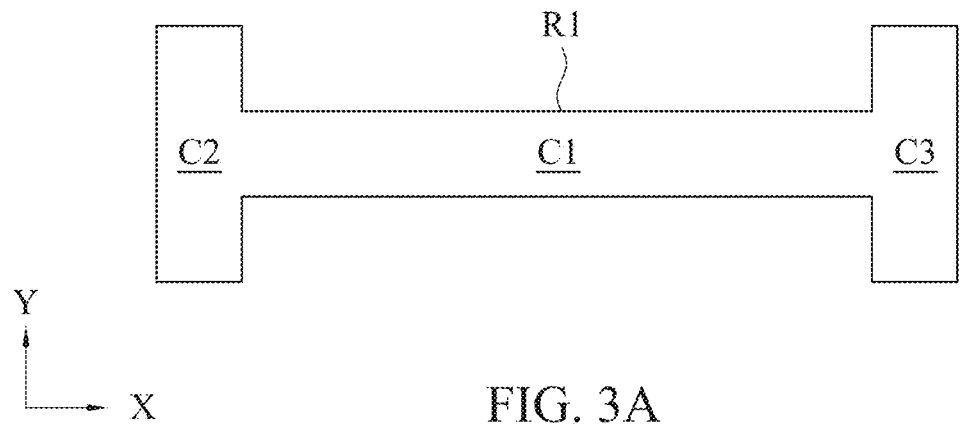
FIGS. 3A and 3B are diagrams of an eFuse, in accordance with some embodiments.
Figure 3B:
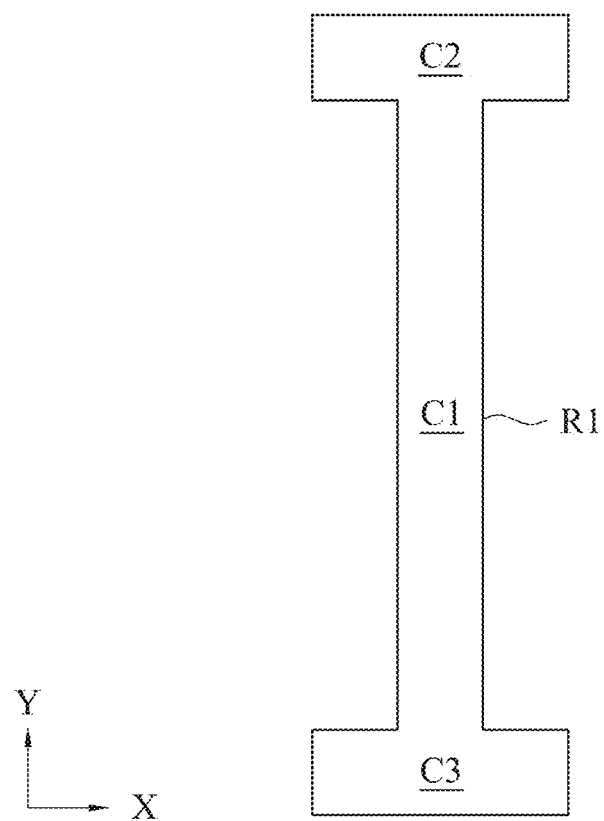

FIGS. 3A and 3B are diagrams of eFuse R1, in accordance with some embodiments, usable as eFuse Rfuse discussed above with respect to FIGS. 1A-1D. Each of FIGS. 3A and 3B depicts a plan view of a layout diagram of eFuse R1 and directions X and Y.

EFuse R1 is an IC structure including a conductive element C1 extending along a given direction between contact regions C2 and C3. In the embodiment depicted in FIG. 3A, eFuse R1 has a horizontal orientation corresponding to conductive element C1 extending along the X direction. In the embodiment depicted in FIG. 3B, eFuse R1 has a vertical orientation corresponding to conductive element C1 extending along the Y direction.

Each of conductive element C1 and contact regions C2 and C3 corresponds to a region in an IC layout diagram used in a manufacturing process to define a segment of one or more conductive materials, non-limiting examples of which include metal, e.g., copper or aluminum, or polysilicon. In some embodiments, one or more of conductive element C1, contact region C2, or contact region C3 is a segment of a metal two layer of an IC manufacturing process.

Conductive element C1 is configured to be capable of being destructively altered, and thereby programmed, by a current greater than a predetermined current level by having a sufficiently small cross-sectional area so that, in operation, the predetermined current level corresponds to a current density capable of producing a destructive temperature through self-heating, and by having sufficient length so that thermal resistance in the segment resists heat dissipation to contact regions C2 and C3, thereby allowing the destructive temperature to be reached.

In various embodiments, conductive element C1 is compatible with IC manufacturing processes by having a width (not labeled) greater than or equal to a minimum width for the conductive layer in which conductive element C1 is formed, and by having a length (not labeled) greater than or equal to a minimum length for the conductive layer in which conductive element C1 is formed.

Conductive element C1 and contact regions C2 and C3 have shapes and relative dimensions depicted in FIGS. 3A and 3B for the purpose of illustration. In various embodiments, conductive element C1 and contact regions C2 and C3 have shapes and relative dimensions different from those depicted in FIGS. 3A and 3B.

Based on the shapes and relative dimensions of conductive element C1 and contact regions C2 and C3, and the capability of being programmed as discussed above, eFuse R1 has a small resistance in the non-programmed state compared to a resistance in the programmed state. In some embodiments, the resistance of eFuse R1 in the non-programmed state has a value ranging from less than 1Ω to 500Ω. In some embodiments, the resistance of eFuse R1 in the non-programmed state has a value ranging from about 5Ω to 200Ω. In some embodiments, the resistance of eFuse R1 in the programmed state has a value ranging 1 kΩ to greater than 100 MΩ. In some embodiments, the resistance of eFuse R1 in the programmed state has a value ranging 10 kΩ to 10 MΩ.

A circuit 100A-100D that includes eFuse R1 as eFuse Rfuse, discussed above with respect to FIGS. 1A-1D, is thereby configured to realize the benefits discussed above with respect to circuits 100A-100D.

FIGS. 4A-4G are diagrams of eFuse structures 400A-400G, in accordance with some embodiments. Each of FIGS. 4A-4G depicts a plan view of an IC layout diagram of a respective eFuse structure 400A-400G and directions X and Y.

Each of eFuse structures 400A-400G includes eFuse R1 and two or more of FinFETs FF1-FF4. In each of the embodiments depicted in FIGS. 4A-4G, eFuse R1 is capable of having either the horizontal orientation discussed above with respect to FIG. 3A or the vertical orientation discussed above with respect to FIG. 3B.

FinFETs FF1 and FF2 are capable of being used as NMOS transistors N0 and N1 of circuit 100B or PMOS transistors P0 and P1 of circuit 100D, and FinFETs FF3 and FF4 are capable of being used as additional parallel transistors, as discussed above with respect to FIGS. 1B and 1D. Accordingly, all of the two or more of FinFETs FF1-FF4 are either n-type or p-type FinFETs.

Each of FinFETs FF1-FF4 is a representation in an IC layout diagram of an IC structure including fin structures F1 and F2 extending along the X direction and gate structures G1 and G2 extending along the Y direction, each of fin structures F1 and F2 intersecting each of gate structures G1 and G2. In some embodiments, FinFETs FF1-FF4 include fin structures F1 and F2 extending along the Y direction and gate structures G1 and G2 extending along the X direction.

In the embodiments depicted in FIGS. 4A-4G, each of FinFETs FF1-FF4 includes two fin structures F1 and F2 and two gate structures G1 and G2 for the purpose of illustration. In various embodiments, one or more of FinFETs FF1-FF4 includes only one of fin structures F1 or F2 or one or more fin structures (not shown) in addition to fin structures F1 and F2, and/or only one of gate structures G1 and G2 or one or more gate structures (not shown) in addition to gate structures G1 and G2.

In the embodiments depicted in FIGS. 4A-4G, each of FinFETs FF1-FF4 includes a same number of fin structures F1 and F2 and gate structures G1 and G2 for the purpose of illustration. In various embodiments, one or more of FinFETs FF1-FF4 includes a number of fin structures different from a number of fin structures of another one or more of FinFETs FF1-FF4, and/or one or more of FinFETs FF1-FF4 includes a number of gate structures different from a number of gate structures of another one or more of FinFETs FF1-FF4.

The depictions of FIGS. 4A-4G are simplified for the purpose of clarity. IC layout diagrams of eFuse structures 400A-400G including FinFETs FF1-FF4 include layout elements (not shown) in addition to fin structures F1 and F2 and gate structures G1 and G2 within and between FinFETs FF1-FF4 and eFuse R1. Non-limiting examples of additional layout elements include n-type and/or p-type active regions within which fin structures F1 and F2 are positioned, fin structure components, gate structure components, source/drain regions and contacts, and polysilicon, metal, or other conductive regions.

Accordingly, eFuse structures 400A-400G corresponding to the IC layout diagrams depicted in respective FIGS. 4A-4G include IC structure features in addition to those defined by the depicted layout elements, as further discussed below with respect to an IC manufacturing system 800, an IC manufacturing flow associated therewith, and FIG. 8.

In the IC layout diagram of eFuse structure 400A depicted in FIG. 4A, FinFETs FF1 and FF2 and eFuse R1 are aligned along the Y direction with eFuse R1 positioned between FinFETs FF1 and FF2. In the IC layout diagram of eFuse structure 400B depicted in FIG. 4B, FinFETs FF1 and FF2 and eFuse R1 are aligned along the X direction with eFuse R1 positioned between FinFETs FF1 and FF2.

Figure 4C:
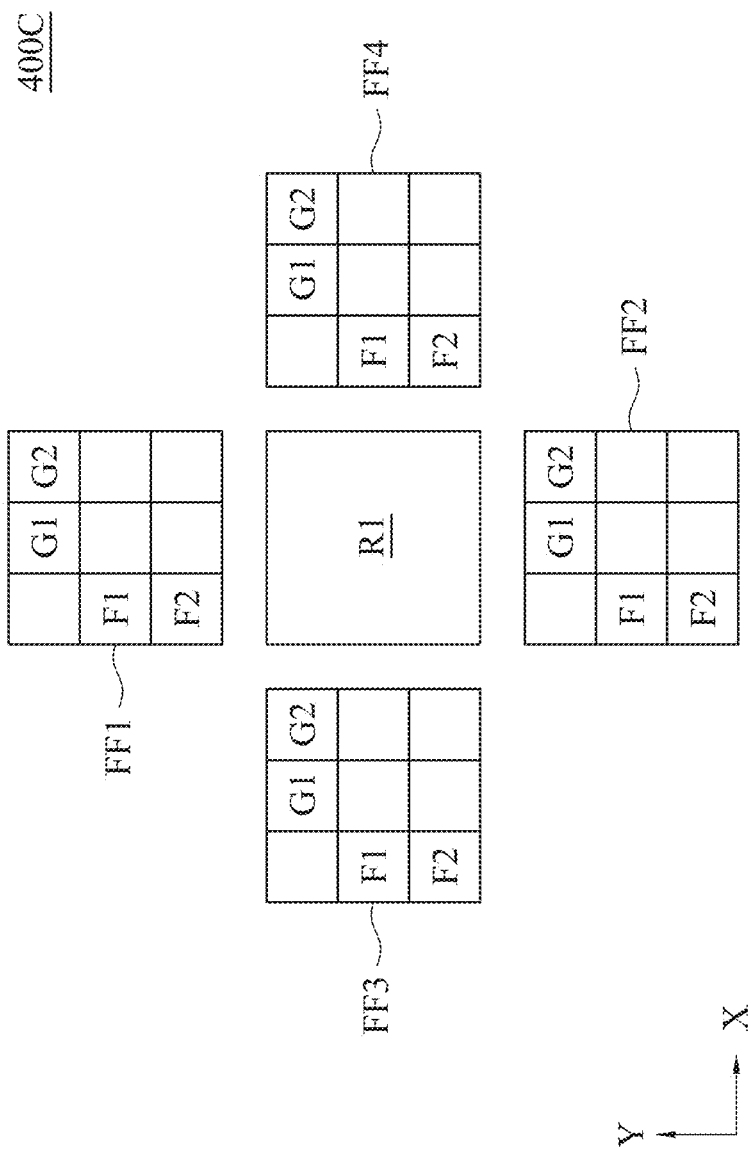

In the IC layout diagram of eFuse structure 400C depicted in FIG. 4C, FinFETs FF1 and FF2 and eFuse R1 are aligned along the Y direction with eFuse R1 positioned between FinFETs FF1 and FF2, and FinFETs FF3 and FF4 and eFuse R1 are aligned along the X direction with eFuse R1 positioned between FinFETs FF3 and FF4. In some embodiments, FinFETs FF1 and FF2 and eFuse R1 are aligned along the X direction, and FinFETs FF3 and FF4 and eFuse R1 are aligned along the Y direction.

In the IC layout diagram of eFuse structure 400D depicted in FIG. 4D, FinFETs FF1 and FF2 and eFuse R1 are aligned along the Y direction with FinFET FF2 positioned between FinFET FF1 and eFuse R1. In the IC layout diagram of eFuse structure 400E depicted in FIG. 4E, FinFETs FF1 and FF2 and eFuse R1 are aligned along the Y direction with FinFET FF1 positioned between eFuse R1 and FinFET FF2.

In the IC layout diagrams of eFuse structures 400F and 400G depicted in respective FIGS. 4F and 4G, FinFETs FF1-FF3 and eFuse R1 are aligned along the Y direction with FinFET FF2 and eFuse R1 positioned between FinFETs FF1 and FF3. In various embodiments, an IC layout diagram of one or more of eFuse structures 400F or 400G includes one or more FinFETs (not shown), e.g., FinFET FF4, in addition to FinFETs FF1-FF3.

In the embodiments depicted in FIGS. 4D-4G, eFuse R1 and two or more of FinFETs FF1-FF3 are aligned in the Y direction. In various embodiments, an IC layout diagram of one or more of eFuse structures 400D-400G includes two or more of FinFETs FF1-FF3 aligned in the X direction.

A circuit 100B or 100D that includes eFuse R1 as eFuse Rfuse and FinFETs FF1 and FF2 as either NMOS transistors N0 and N1 or PMOS transistors P0 and P1, discussed above with respect to FIGS. 1B and 1D, and configured in accordance with one of the embodiments of FIGS. 4A-4G is thereby capable of realizing the benefits discussed above with respect to circuits 100A-100D.

An IC structure corresponding to an IC layout diagram configured in accordance with one of the embodiments of FIGS. 4A-4G includes parallel programming current paths and greater routing flexibility than approaches in which an eFuse is programmed by a single program device, and is thereby capable of having lower programming current path resistance in comparison to approaches in which an eFuse is programmed by a single program device.

Figure 5A:
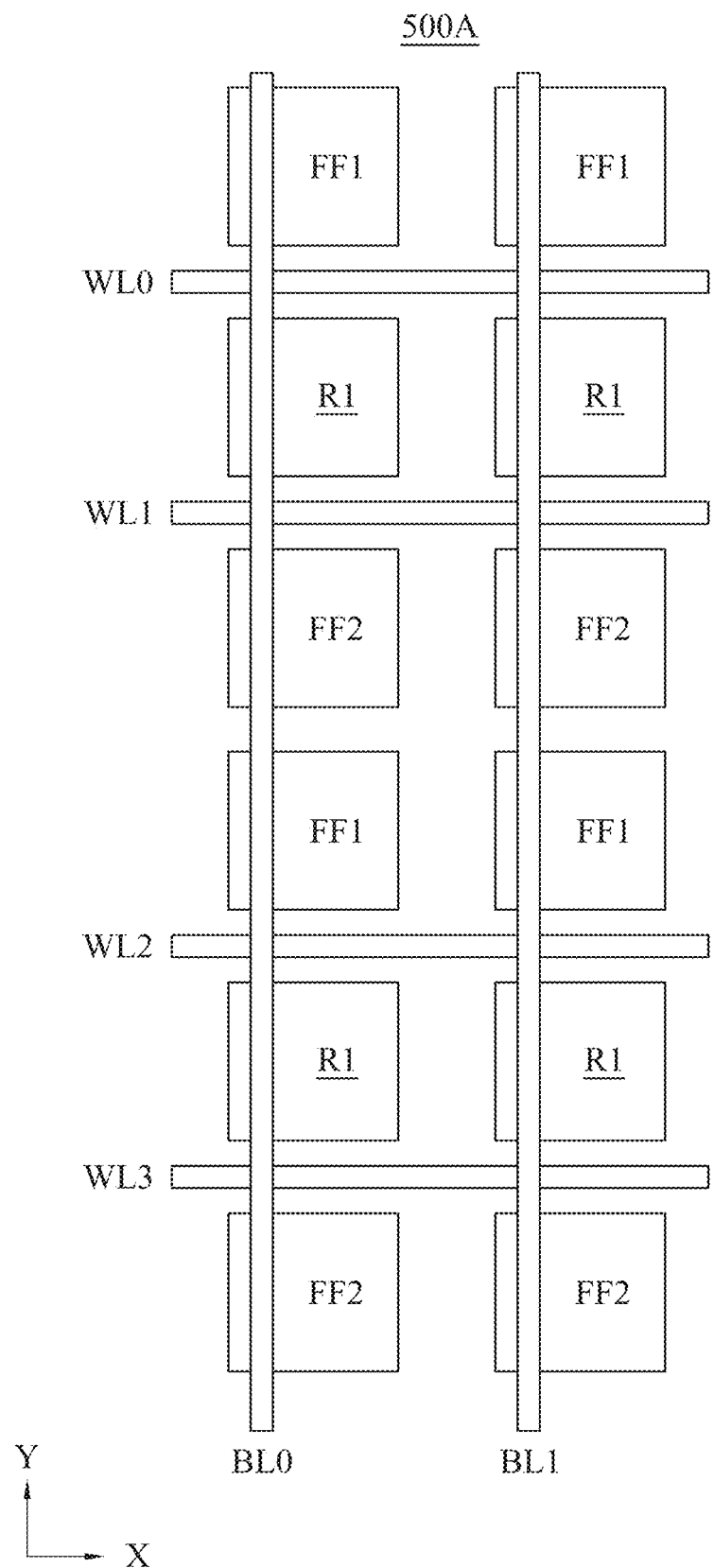
FIGS. 5A and 5B are diagrams of eFuse structures, in accordance with some embodiments.
Figure 5B:
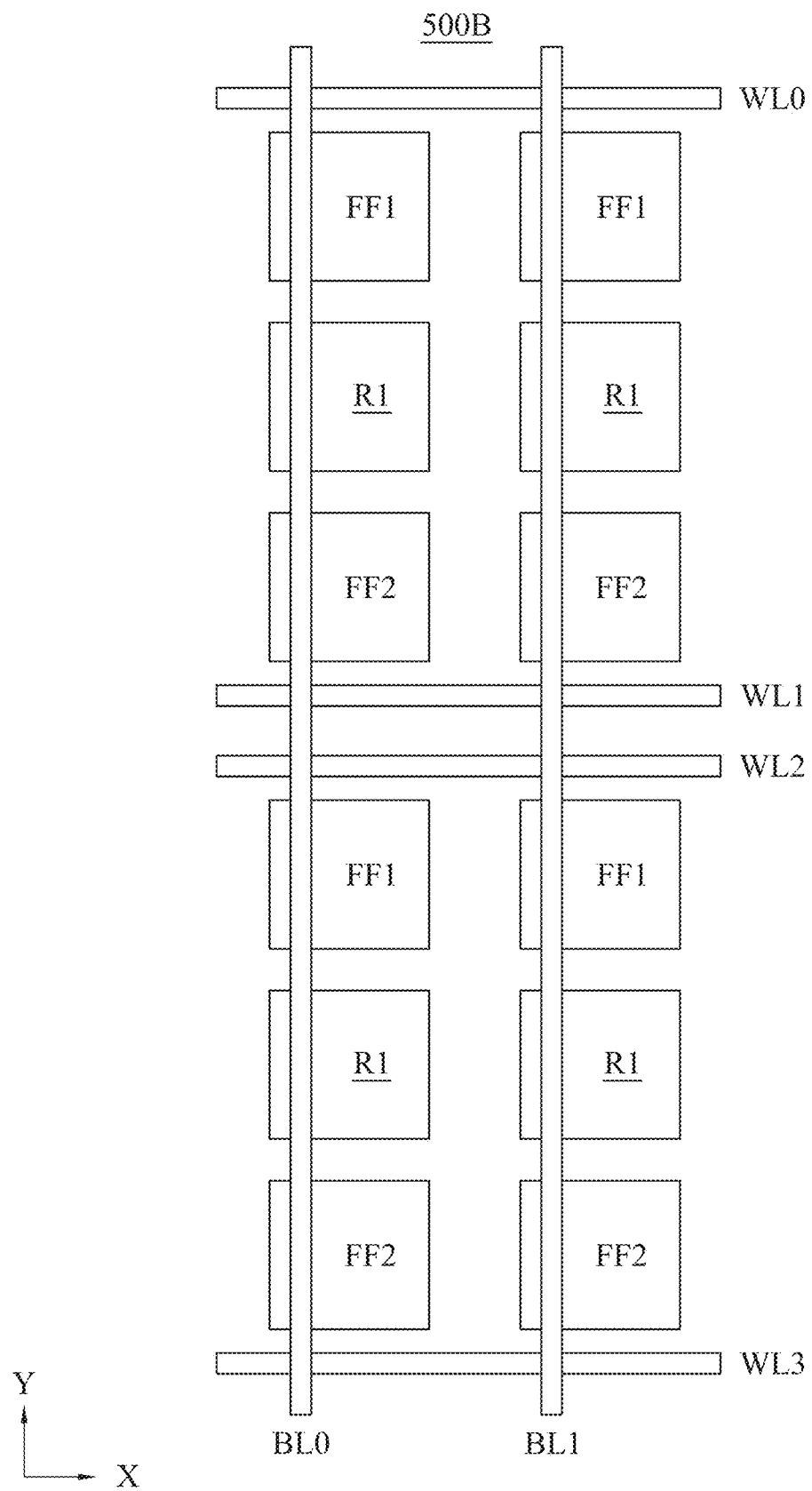

FIGS. 5A and 5B are diagrams of eFuse structures 500A and 500B, in accordance with some embodiments. Each of FIGS. 5A and 5B depicts a plan view of an IC layout diagram of a respective eFuse structure 500A or 500B and directions X and Y.

Each of eFuse structures 500A and 500B includes signal lines WL0 and WL1, discussed above with respect to FIGS. 1A-1D, eFuse R1, discussed above with respect to FIGS. 3A and 3B, FinFETs FF1 and FF2, discussed above with respect to FIGS. 4A-4G, signal lines WL2 and WL3, and bit lines BL0 and BL1. Signal line WL2 is usable as signal line WL0, signal line WL3 is usable as signal line WL1, and each of bit lines BL0 and BL1 is usable as bit line BL, discussed above with respect to FIGS. 1A-1D. In each of the embodiments depicted in FIGS. 5A and 5B, eFuse R1 is capable of having either the horizontal orientation discussed above with respect to FIG. 3A or the vertical orientation discussed above with respect to FIG. 3B.

In the embodiment depicted in FIG. 5A, the IC layout diagram of eFuse structure 500A includes signal line WL0 positioned between first pairs of FinFETs FF1 and eFuses R1, signal line WL1 positioned between the first pair of eFuses R1 and a first pair of FinFETs FF2, signal line WL2 positioned between second pairs of FinFETs FF1 and eFuses R1, and signal line WL3 positioned between the second pair of eFuses R1 and a second pair of FinFETs FF2.

In the embodiment depicted in FIG. 5B, the IC layout diagram of eFuse structure 500B includes a first pair of FinFETs FF1 positioned between signal line WL0 and a first pair of eFuses R1, a first pair of FinFETs FF2 positioned between the first pair of eFuses R1 and signal line WL1, a second pair of FinFETs FF1 positioned between signal line WL2 and a second pair of eFuses R1, and a second pair of FinFETs FF2 positioned between the second pair of eFuses R1 and signal line WL3.

In the embodiments depicted in FIGS. 5A and 5B, each of the IC layout diagrams of respective eFuse structures 500A and 500B includes bit line BL0 overlying a first two of eFuses R1 aligned in the Y direction and bit line BL1 overlying a second two of eFuses R1 aligned in the Y direction. In some embodiments, an eFuse structure 500A or 500B is a portion of a memory circuit in which a given memory cell includes an eFuse R1 and corresponding FinFETs FF1 and FF2.

For the purpose of clarity, the depictions of FIGS. 5A and 5B are simplified in that FinFETs FF1 and FF2 do not show fin structures F1 and F2 and gate structures G1 and G2, and the layout diagrams of respective eFuse structures 500A and 500B do not include layout elements in addition to FinFETs FF1 and FF2, eFuse R1, signal lines WL0-WL3, and bit lines BL0 and BL1. As a non-limiting example, at a location at which a given bit line BL0 or BL1 overlies a given eFuse R1, an IC layout diagram of eFuse structure 500A or 500B includes one or more conductive regions (not shown) at the location such that an eFuse structure 500A or 500B manufactured based on the IC layout diagram includes an electrical connection between the given bit line BL0 or BL1 and a conductive segment defined by one of contact regions C2 or C3 of eFuse R1, discussed above with respect to FIGS. 3A and 3B.

Additional non-limiting examples of layout elements that are not depicted in FIGS. 5A and 5B but included in some embodiments of IC layout diagrams of eFuse structures 500A and/or 500B include n-type and/or p-type active regions within which fin structures F1 and F2 are positioned, fin structure components, gate structure components, source/drain regions and contacts, and polysilicon, metal, or other conductive regions.

Accordingly, eFuse structures 500A and 500B corresponding to the IC layout diagrams depicted in respective FIGS. 5A and 5B include IC structure features in addition to those defined by the depicted layout elements, as further discussed below with respect to IC manufacturing system 800, IC manufacturing flow associated therewith, and FIG. 8.

In the embodiments depicted in FIGS. 5A and 5B, each of the IC layout diagrams of respective eFuse structures 500A and 500B includes four eFuses R1 arranged in two rows and two columns. In various embodiments, an IC layout diagram of an eFuse structure 500A or 500B includes fewer or greater than four eFuses R1, fewer or greater than two rows of eFuses R1, or fewer or greater than two columns of eFuses R1. In some embodiments, an IC layout diagram of an eFuse structure 500A or 500B includes a single eFuse R1.

In the embodiments depicted in FIGS. 5A and 5B, each of the IC layout diagrams of respective eFuse structures 500A and 500B includes signal lines WL0-WL3 oriented along the X direction, bit lines BL0 and BL1 oriented along the Y direction, and FinFETs FF1 and FF2 and eFuse R1 oriented along the Y direction. In some embodiments, an IC layout diagram of an eFuse structure 500A or 500B includes signal lines WL0-WL3 oriented along the Y direction, bit lines BL0 and BL1 oriented along the X direction, and FinFETs FF1 and FF2 and eFuse R1 oriented along the X direction.

In the embodiments depicted in FIGS. 5A and 5B, each of the IC layout diagrams of respective eFuse structures 500A and 500B corresponds to the IC layout diagram of eFuse structure 400A discussed above with respect to FIG. 4A. In embodiments in which signal lines WL0-WL3 are oriented along the Y direction, bit lines BL0 and BL1 are oriented along the X direction, and FinFETs FF1 and FF2 and eFuse R1 are oriented along the X direction, an IC layout diagram of an eFuse structure 500A or 500B corresponds to the IC layout diagram of eFuse structure 400B discussed above with respect to FIG. 4B.

In various embodiments, an IC layout diagram of an eFuse structure 500A or 500B corresponds to an IC layout diagram of one of eFuse structures 400C-400G by including one or both of FinFETs FF3 or FF4 as depicted in respective FIGS. 4C-4G.

A circuit 100B or 100D that includes eFuse R1 as eFuse Rfuse and FinFETs FF1 and FF2 configured in accordance with one of the embodiments of FIG. 5A or 5B is thereby capable of realizing the benefits discussed above with respect to circuits 100A-100D and with respect to IC layout diagrams of eFuse structures 400A-400G.

Figure 6:
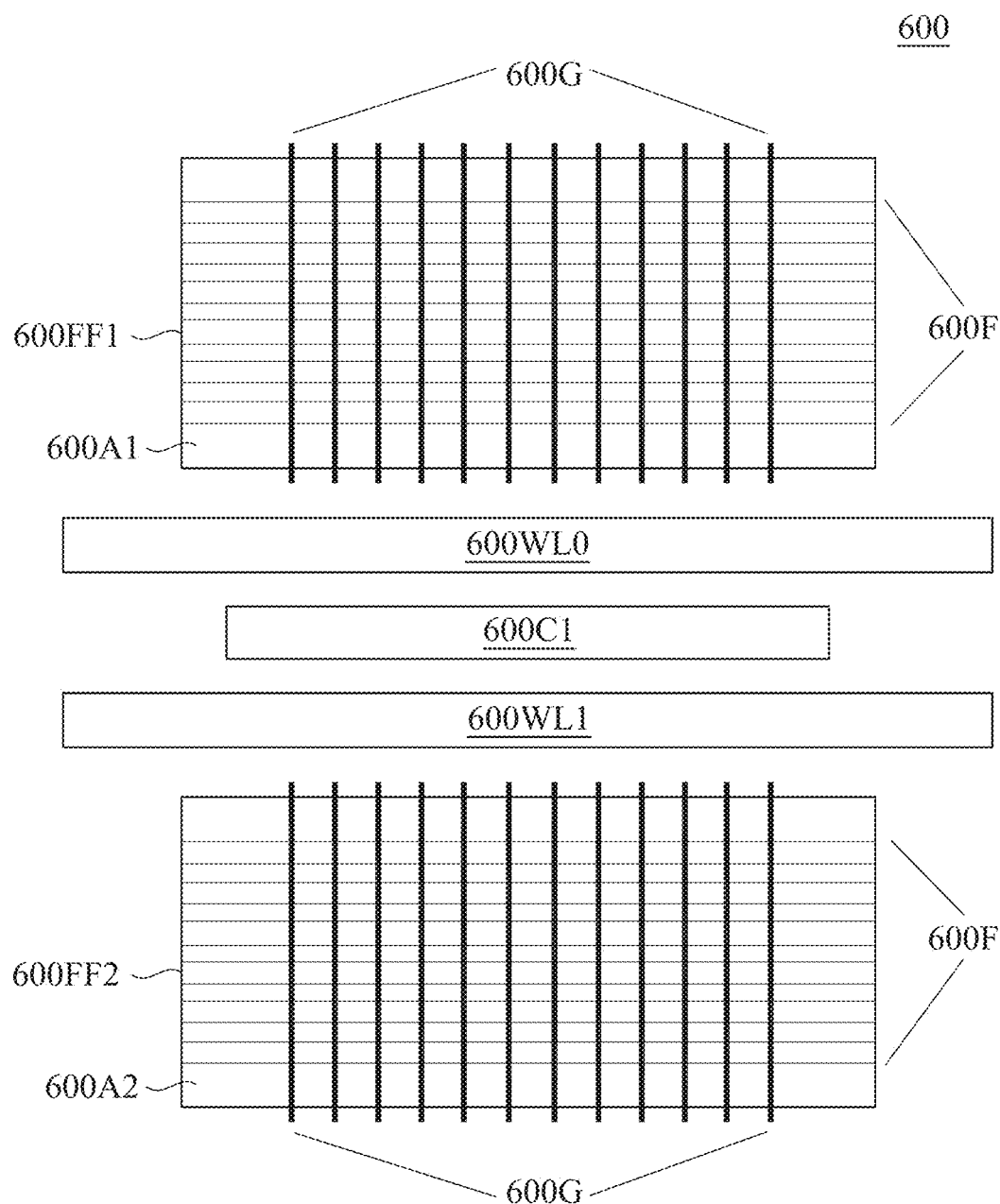
FIG. 6 is a diagram of an eFuse structure, in accordance with some embodiments.

FIG. 6 is a diagram of an eFuse structure 600, in accordance with some embodiments. FIG. 6 depicts a plan view of an IC layout diagram of eFuse structure 600 including FinFETs 600FF1 and 600FF2, an eFuse conductive element 600C1 positioned between FinFETs 600FF1 and 600FF2, a word line 600WL0 positioned between FinFET 600FF1 and eFuse conductive element 600C1, and a word line 600WL1 positioned between eFuse conductive element 600C1 and FinFET 600FF2.

Word lines 600WL0 and 600WL1 are usable as signal lines WL0 and WL1, discussed above with respect to FIGS. 1A-1D, and eFuse conductive element 600C1 is usable as conductive element C1, discussed above with respect to FIGS. 3A and 3B. FinFETs 600FF1 and 600FF2 are usable as FinFETs FF1 and FF2, discussed above with respect to FIGS. 4A-4G, arranged in accordance with the IC layout diagram of eFuse structure 500A, discussed above with respect to FIG. 5A. In some embodiments, FinFETs 600FF1 and 600FF2 are arranged in accordance with the IC layout diagram of eFuse structure 500B, discussed above with respect to FIG. 5B.

FinFETs 600FF1 and 600FF2 include respective active regions 600A1 and 600A2, used to define an active area of an IC structure in which fin structures 600F are formed. Each of FinFETs 600FF1 and 600FF2 includes gate structures 600G perpendicular to, and overlapping each of fin structures 600F. Fin structures 600F correspond to fin structures F1 and F2 of FinFETs FF1-FF4 and gate structures 600G correspond to gate structures G1 and G2 of FinFETs FF1-FF4, discussed above with respect to FIGS. 4A-4G.

In the embodiment depicted in FIG. 6, each of FinFETs 600FF1 and 600FF2 includes twelve fin structures 600F and twelve gate structures 600G. In various embodiments, one or both of FinFETs 600FF1 or 600FF2 includes fewer or greater than twelve fin structures 600F and/or fewer or greater than twelve gate structures 600G.

In the embodiment depicted in FIG. 6, each of FinFETs 600FF1 and 600FF2 includes a same number of fin structures 600F and gate structures 600G. In various embodiments, one of FinFETs 600FF1 or 600FF2 includes a greater number of fin structures 600F than the other of FinFETs 600FF1 or 600FF2. In various embodiments, one of FinFETs 600FF1 or 600FF2 includes a greater number of gate structures than the other of FinFETs 600FF1 or 600FF2.

The depiction of FIG. 6 is simplified for the purpose of clarity. IC layout diagrams including an IC layout diagram of eFuse structure 600 include layout elements (not shown) in addition to FinFETs 600FF1 and 600FF2, word lines 600WL0 and 600WL1, and eFuse conductive element 600C1. Non-limiting examples of additional layout elements include fin structure components, gate structure components, source/drain regions and contacts, eFuse contact regions, and polysilicon, metal, or other conductive regions.

Accordingly, an eFuse structure 600 corresponding to the IC layout diagram depicted in FIG. 6 includes IC structure features in addition to those defined by the depicted layout elements, as further discussed below with respect to IC manufacturing system 800, IC manufacturing flow associated therewith, and FIG. 8.

A circuit 100B or 100D that includes eFuse conductive element 600C1 included in eFuse Rfuse, FinFETs 600FF1 and 600FF2 as NMOS transistors N0 and N1 or PMOS transistors P0 and P1, and word lines 600WL0 and 600WL1 as signal lines WL0 and WL1, configured in accordance with the embodiment of FIG. 6, is thereby capable of realizing the benefits discussed above with respect to circuits 100A-100D and with respect to the IC layout diagram of eFuse structure 500A.

By including two FinFETs having independently configurable numbers of fin and gate structures instead of a single program device, an IC structure corresponding to the IC layout diagram embodiment of FIG. 6 is capable of having a reduced area compared to approaches in which an eFuse is programmed by a single program device.

Figure 7:
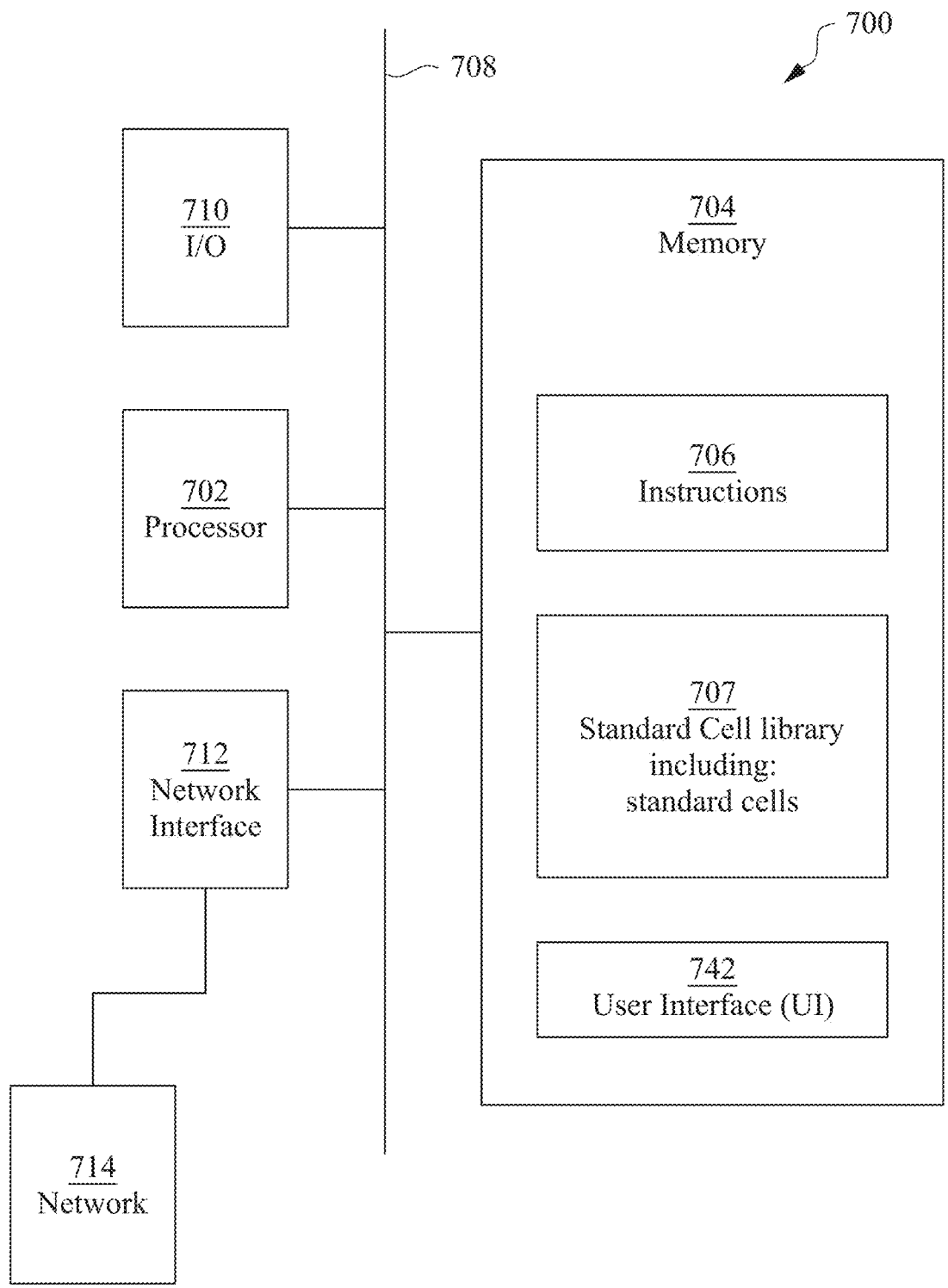
FIG. 7 is a block diagram of an electronic design automation (EDA) system, in accordance with some embodiments.

FIG. 7 is a block diagram of an electronic design automation (EDA) system 700, in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of, e.g., a method 900 described below with respect to FIG. 9 (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein, e.g., a memory cell including an eFuse R1 discussed above with respect to FIGS. 3A and 3B.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
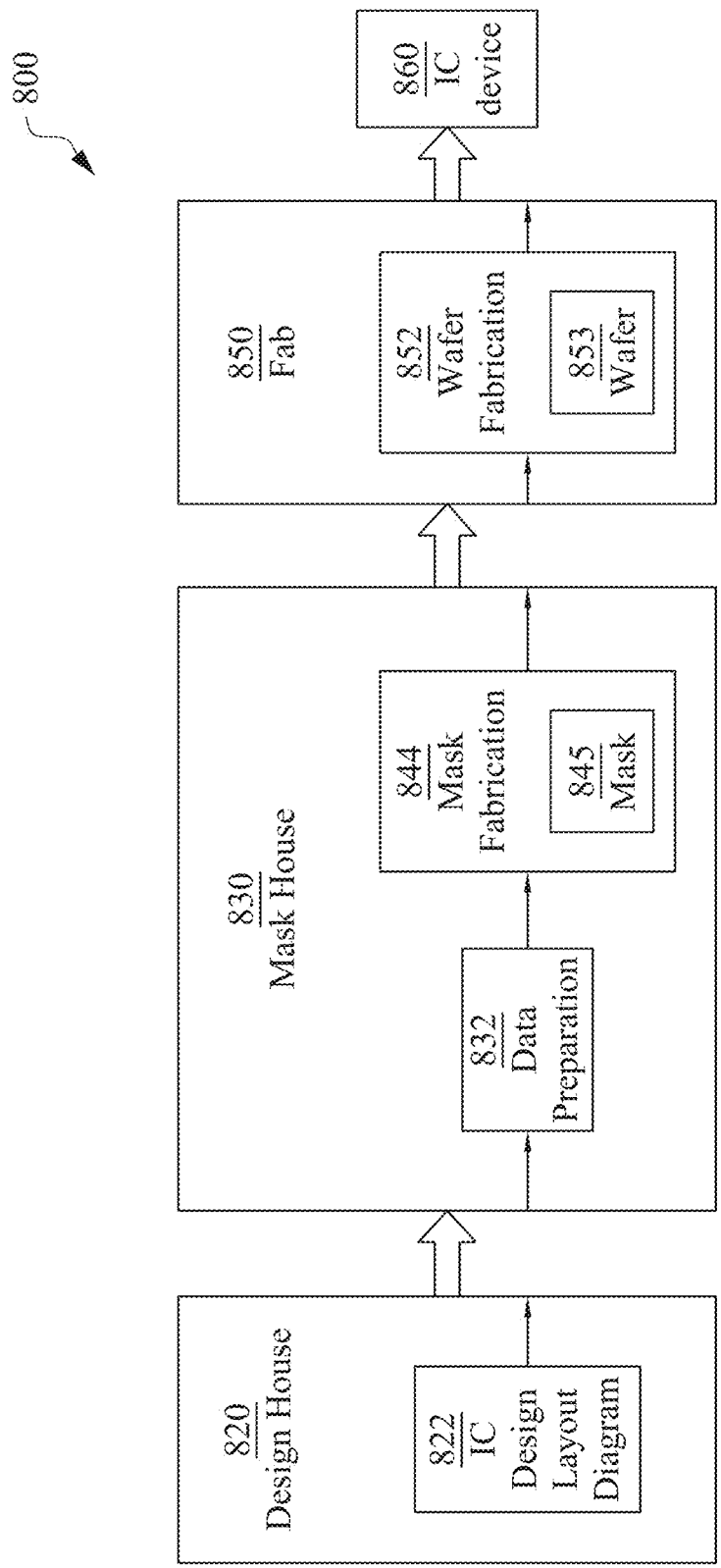
FIG. 8 is a block diagram of an integrated circuit (IC) manufacturing system, and an IC manufacturing flow associated therewith, in accordance with some embodiments.

FIG. 8 is a block diagram of IC manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet.

The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns, e.g., an IC layout diagram depicted in FIG. 3A, 3B, 4A-4G, 5A, 5B, or 6, designed for an IC device 860, e.g., eFuse R1 or eFuse structures 400A-400G, 500A, 500B, or 600, discussed above with respect to FIGS. 3A, 3B, 4A-4G, 5A, 5B, and 6. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 10, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 1045 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Figure 9:
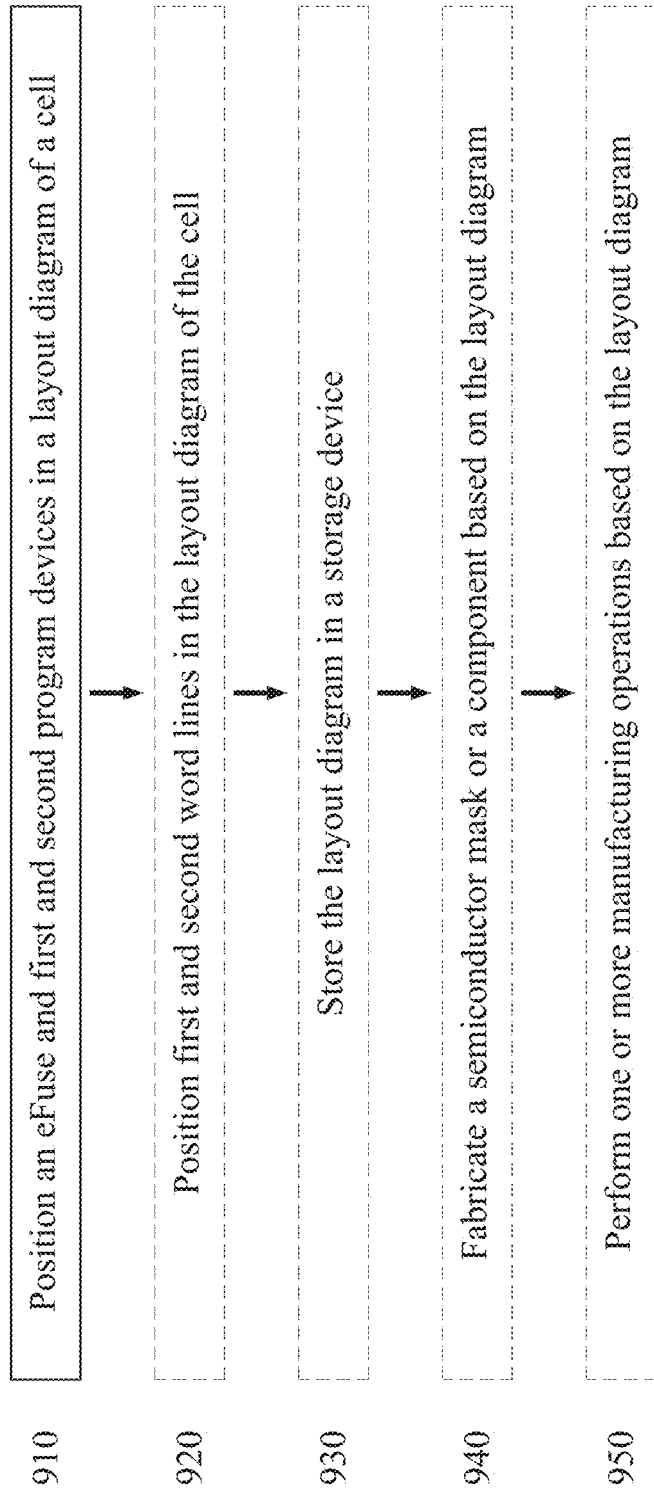
FIG. 9 is a flowchart of a method of generating a layout diagram of an IC, in accordance with some embodiments.

FIG. 9 is a flowchart of a method 900 of generating a layout diagram of an IC, in accordance with some embodiments. The operations of method 900 are capable of being performed as part of a method of forming one or more IC devices including one or more eFuse structures, e.g., eFuse R1 or eFuse structures 400A-400G, 500A, 500B, or 600, discussed above with respect to FIGS. 3A, 3B, 4A-4G, 5A, 5B, and 6, manufactured based on the generated IC layout diagram. Non-limiting examples of IC devices include memory circuits, logic devices, processing devices, signal processing circuits, and the like.

In some embodiments, some or all of the operations of method 900 are capable of being performed as part of an APR method. In some embodiments, some or all of the operations of method 900 are capable of being performed by an APR system, e.g., a system included in EDA system 700, discussed above with respect to FIG. 7, and configured to perform the APR method.

Some or all of the operations of method 900 are capable of being performed as part of a design procedure performed in a design house, e.g., design house 820 discussed above with respect to FIG. 8.

In some embodiments, some or all of method 900 is executed by a processor of a computer. In some embodiments, some or all of method 900 is executed by a processor 702 of EDA system 700, discussed above with respect to FIG. 7.

In some embodiments, the operations of method 900 are performed in the order depicted in FIG. 9. In some embodiments, the operations of method 900 are performed in an order other than the order depicted in FIG. 9. In some embodiments, one or more operations are performed before, between, during, and/or after performing one or more operations of method 900.

At operation 910, an eFuse and first and second program devices are positioned in a layout diagram of a cell. Positioning the eFuse and first and second program devices includes positioning layout elements in the layout diagram of the cell to cause the first and second program devices manufactured based on the IC layout diagram to be configured in parallel with each other and in series with the eFuse. In some embodiments, positioning the eFuse and first and second program devices includes positioning the layout elements in the layout diagram of the cell to cause the eFuse and the first program device manufactured based on the IC layout diagram to be coupled in series between a bit line and a program node, and to cause the eFuse and the second program device manufactured based on the IC layout diagram to be coupled in series between the bit line and the program node.

In some embodiments, positioning the eFuse and first and second program devices includes positioning the eFuse and first and second program devices in a memory cell of a memory circuit. In some embodiments, positioning the eFuse and first and second program devices includes positioning one or more program devices in the cell in addition to the first and second program devices.

In some embodiments, positioning the eFuse and first and second program devices includes positioning eFuse R1, discussed above with respect to FIGS. 3A and 3B. In some embodiments, positioning the eFuse and first and second program devices includes positioning program devices PD0 and PD1, discussed above with respect to FIGS. 1A-1D.

In some embodiments, positioning the eFuse and first and second program devices includes positioning two or more FinFET devices in the cell. In various embodiments, positioning the eFuse and first and second program devices includes positioning two or more FinFET devices in accordance with one or more of the IC layout diagrams depicted in FIG. 3A, 3B, 4A-4G, 5A, 5B, or 6 and corresponding to respective eFuse structures 400A-400G, 500A, 500B, or 600.

In some embodiments, positioning the eFuse and first and second program devices includes positioning one or more layout elements to cause the IC device manufactured based on the IC layout diagram to include an electrical connection between the eFuse and a bit line overlying the cell. In various embodiments, the bit line is bit line BL, discussed above with respect to FIGS. 1A-1D, or one of bit lines BL0 or BL1, discussed above with respect to FIGS. 5A and 5B.

At operation 920, in some embodiments, first and second word lines are positioned in the layout diagram of the cell. Positioning the first and second word lines includes positioning layout elements to cause the IC device manufactured based on the IC layout diagram to include an electrical connection between the first program device and the first word line and an electrical connection between the second program device and the second word line.

In some embodiments, positioning the first and second word lines includes positioning layout elements to cause the IC device manufactured based on the IC layout diagram to include an electrical connection between a gate of a first FinFET and the first word line and an electrical connection between a second FinFET and the second word line. In various embodiments, first and second FinFETs include FinFETs FF1 and FF2 discussed above with respect to FIGS. 4A-5B or FinFETs 600FF1 and 600FF2 discussed above with respect to FIG. 6.

In various embodiments, positioning the first and second word lines includes positioning signal lines WL0 and WL1 or WL2 and WL3, discussed above with respect to FIGS. 1A-1D, 5A, and 5B.

At operation 930, in some embodiments, the IC layout diagram is stored in a storage device. In various embodiments, storing the IC layout diagram in the storage device includes storing the IC layout diagram in a non-volatile, computer-readable memory or a cell library, e.g., a database, and/or includes storing the IC layout diagram over a network. In some embodiments, storing the IC layout diagram in the storage device includes storing the IC layout diagram over network 714 of EDA system 700, discussed above with respect to FIG. 7.

At operation 940, in some embodiments, at least one of one or more semiconductor masks, or at least one component in a layer of a semiconductor IC is fabricated based on the IC layout diagram. Fabricating one or more semiconductor masks or at least one component in a layer of a semiconductor IC is discussed above with respect to FIG. 8.

At operation 950, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed above with respect to FIG. 8.

By executing some or all of the operations of method 900, an IC layout diagram is generated in which parallel program devices are included with an eFuse in a cell. IC layout diagrams, and IC devices manufactured based on the IC layout diagrams, are thereby capable of realizing the benefits discussed above with respect to circuits 100A-100D and IC layout diagrams of eFuse structures 400A-400G, 500A, 500B, and 600.

In some embodiments, an IC structure includes a first active area including a first plurality of fin structures extending in a first direction, a second active area including a second plurality of fin structures extending in the first direction, an eFuse conductive segment extending in the first direction between the first and second active areas and electrically connected to each of the first and second pluralities of fin structures, a first plurality of gate structures extending over the first active area in a second direction perpendicular to the first direction, a second plurality of gate structures extending over the second active area in the second direction, a first signal line extending in the first direction adjacent to the first active area and electrically connected to the first plurality of gate structures, and a second signal line extending in the first direction adjacent to the second active area and electrically connected to the second plurality of gate structures. In some embodiments, the first and second active areas are both n-type active areas or p-type active areas. In some embodiments, each of the first plurality of gate structures and the second plurality of gate structures includes a total of twelve gate structures. In some embodiments, each of the first plurality of fin structures and the second plurality of fin structures includes a total of twelve fin structures. In some embodiments, the first and second pluralities of fin structures are electrically connected to a first end of the eFuse conductive segment, and a second end of the eFuse conductive segment is electrically connected to a bit line. In some embodiments, the first and second active areas are both n-type active areas, and each of the first and second pluralities of fin structures is further electrically connected to a same node configured to carry a reference voltage. In some embodiments, the first and second active areas are both p-type active areas, and each of the first and second pluralities of fin structures is further electrically connected to a same node configured to carry a power supply voltage. In some embodiments, the first signal line is included in a first word line, and the second signal line is included in a second word line separate from the first word line. In some embodiments, the IC structure is a first IC structure, and each of the first and second signal lines is electrically connected to a second IC structure. In some embodiments, the eFuse conductive segment includes a segment of a metal two layer.

In some embodiments, a method of manufacturing an IC structure includes constructing a first plurality of fin structures extending in a first direction in a first active area and a second plurality of fin structures extending in the first direction in a second active area, constructing a first plurality of gate structures extending over the first active area in a second direction perpendicular to the first direction, and a second plurality of gate structures extending over the second active area in the second direction, forming an eFuse conductive segment extending in the first direction between the first and second active areas, forming electrical connections from the eFuse conductive segment to each of the first and second pluralities of fin structures, forming first and second signal lines extending in the first direction adjacent to the respective first and second active areas, and forming electrical connections from the first signal line to the first plurality of gate structures and from the second signal line to the second plurality of gate structures. In some embodiments, constructing the first and second pluralities of fin structures includes constructing the first and second pluralities of fin structures in the respective first and second active areas both being n-type active areas or p-type active areas. In some embodiments, each of constructing the first and second pluralities of fin structures includes constructing a total of twelve fin structures, and each of the constructing the first and second pluralities of gate structures includes constructing a total of twelve gate structures. In some embodiments, the method includes forming electrical connections from each of the first and second pluralities of fin structures to a program node. In some embodiments, the method includes forming an electrical connection from the eFuse conductive segment to a bit line. In some embodiments, forming the eFuse conductive segment includes forming a segment of a metal two layer of a manufacturing process.

In some embodiments, a method of manufacturing an IC structure includes constructing a first plurality of fin structures extending in a first direction in a first active area and a second plurality of fin structures extending in the first direction in a second active area, constructing a first plurality of gate structures extending across the first plurality of fin structures, thereby forming a first plurality of FinFETs, constructing a second plurality of gate structures extending across the second plurality of fin structures, thereby forming a second plurality of FinFETs, forming an eFuse conductive segment extending in the first direction between the first and second pluralities of FinFETs, a first signal line extending in the first direction between the first plurality of FinFETs and the eFuse conductive segment, and a second signal line extending in the first direction between the second plurality of FinFETs and the eFuse conductive segment, forming electrical connections from the eFuse conductive segment to each of the first and second pluralities of FinFETs, and forming electrical connections from the first signal line to the first plurality of gate structures and from the second signal line to the second plurality of gate structures. In some embodiments, each of forming the first and second pluralities of FinFETs includes forming a plurality of n-type FinFETs, and the method includes forming electrical connections from each of the first and second pluralities of FinFETs to a node configured to carry a reference voltage. In some embodiments, each of the forming the first and second pluralities of FinFETs includes forming a plurality of p-type FinFETs, and the method includes forming electrical connections from each of the first and second pluralities of FinFETs to a node configured to carry a power supply voltage. In some embodiments, each of the forming the first and second pluralities of FinFETs includes constructing a total of twelve fin structures and a total of twelve gate structures.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:
1. An integrated circuit (IC) structure comprising:
a first active area comprising a first plurality of fin structures extending in a first direction;
a second active area comprising a second plurality of fin structures extending in the first direction;
an electrical fuse (eFuse) conductive segment extending in the first direction between the first and second active areas and electrically connected to each of the first and second pluralities of fin structures;
a first plurality of gate structures extending over the first active area in a second direction perpendicular to the first direction;
a second plurality of gate structures extending over the second active area in the second direction;
a first signal line extending in the first direction adjacent to the first active area and electrically connected to the first plurality of gate structures; and
a second signal line extending in the first direction adjacent to the second active area and electrically connected to the second plurality of gate structures.

2. The IC structure of claim 1, wherein the first and second active areas are both n-type active areas or p-type active areas.

3. The IC structure of claim 1, wherein each of the first plurality of gate structures and the second plurality of gate structures comprises a total of twelve gate structures.

4. The IC structure of claim 3, wherein each of the first plurality of fin structures and the second plurality of fin structures comprises a total of twelve fin structures.

5. The IC structure of claim 1, wherein
the first and second pluralities of fin structures are electrically connected to a first end of the eFuse conductive segment, and
a second end of the eFuse conductive segment is electrically connected to a bit line.

6. The IC structure of claim 1, wherein
the first and second active areas are both n-type active areas, and
each of the first and second pluralities of fin structures is further electrically connected to a same node configured to carry a reference voltage.

7. The IC structure of claim 1, wherein
the first and second active areas are both p-type active areas, and
each of the first and second pluralities of fin structures is further electrically connected to a same node configured to carry a power supply voltage.

8. The IC structure of claim 1, wherein
the first signal line is included in a first word line, and
the second signal line is included in a second word line separate from the first word line.

9. The IC structure of claim 1, wherein
the IC structure is a first IC structure, and
each of the first and second signal lines is electrically connected to a second IC structure.

10. The IC structure of claim 1, wherein the eFuse conductive segment comprises a segment of a metal two layer.

11. A method of manufacturing an integrated circuit (IC) structure, the method comprising:
constructing a first plurality of fin structures extending in a first direction in a first active area and a second plurality of fin structures extending in the first direction in a second active area;
constructing a first plurality of gate structures extending over the first active area in a second direction perpendicular to the first direction, and a second plurality of gate structures extending over the second active area in the second direction;
forming an electrical fuse (eFuse) conductive segment extending in the first direction between the first and second active areas;
forming electrical connections from the eFuse conductive segment to each of the first and second pluralities of fin structures;
forming first and second signal lines extending in the first direction adjacent to the respective first and second active areas; and
forming electrical connections from the first signal line to the first plurality of gate structures and from the second signal line to the second plurality of gate structures.

12. The method of claim 11, wherein
the constructing the first and second pluralities of fin structures comprises constructing the first and second pluralities of fin structures in the respective first and second active areas both being n-type active areas or p-type active areas.

13. The method of claim 11, wherein
each of the constructing the first and second pluralities of fin structures comprises constructing a total of twelve fin structures, and
each of the constructing the first and second pluralities of gate structures comprises constructing a total of twelve gate structures.

14. The method of claim 11, further comprising forming electrical connections from each of the first and second pluralities of fin structures to a program node.

15. The method of claim 11, further comprising forming an electrical connection from the eFuse conductive segment to a bit line.

16. The method of claim 11, wherein the forming the eFuse conductive segment comprises forming a segment of a metal two layer of a manufacturing process.

17. A method of manufacturing an integrated circuit (IC) structure, the method comprising:
constructing a first plurality of fin structures extending in a first direction in a first active area and a second plurality of fin structures extending in the first direction in a second active area;
constructing a first plurality of gate structures extending across the first plurality of fin structures, thereby forming a first plurality of fin field-effect transistors (FinFETs);
constructing a second plurality of gate structures extending across the second plurality of fin structures, thereby forming a second plurality of FinFETs;
forming an electrical fuse (eFuse) conductive segment extending in the first direction between the first and second pluralities of FinFETs, a first signal line extending in the first direction between the first plurality of FinFETs and the eFuse conductive segment, and a second signal line extending in the first direction between the second plurality of FinFETs and the eFuse conductive segment;
forming electrical connections from the eFuse conductive segment to each of the first and second pluralities of FinFETs; and
forming electrical connections from the first signal line to the first plurality of gate structures and from the second signal line to the second plurality of gate structures.

18. The method of claim 17, wherein
each of the forming the first and second pluralities of FinFETs comprises forming a plurality of n-type FinFETs, and
the method further comprises forming electrical connections from each of the first and second pluralities of FinFETs to a node configured to carry a reference voltage.

19. The method of claim 17, wherein
each of the forming the first and second pluralities of FinFETs comprises forming a plurality of p-type FinFETs, and
the method further comprises forming electrical connections from each of the first and second pluralities of FinFETs to a node configured to carry a power supply voltage.

20. The method of claim 17, wherein
each of the forming the first and second pluralities of FinFETs comprises constructing a total of twelve fin structures and a total of twelve gate structures.

* * * * *